(12) United States Patent
Neuenschwander et al.

(10) Patent No.: US 6,877,214 B2
(45) Date of Patent: Apr. 12, 2005

(54) METHOD OF MANUFACTURING A STACK OF LAMINATIONS

(75) Inventors: Thomas R. Neuenschwander, Fort Wayne, IN (US); Steven D. Shane, Fort Wayne, IN (US)

(73) Assignee: L. H. Carbide Corporation, Fort Wayne, IN (US)

( * ) Notice: Subject to any disclaimer, the term of this patent is extended or adjusted under 35 U.S.C. 154(b) by 72 days.

(21) Appl. No.: 10/287,973

(22) Filed: Nov. 5, 2002

(65) Prior Publication Data

US 2004/0083600 A1 May 6, 2004

(51) Int. Cl.[7] ................................................ H01F 7/06
(52) U.S. Cl. ........................ 29/609; 29/596; 29/598; 29/738; 29/742
(58) Field of Search .......................... 29/609, 596, 598, 29/738, 742

(56) References Cited

U.S. PATENT DOCUMENTS

| | | | |
|---|---|---|---|
| 4,160,182 A | * 7/1979 | Mitsui | 310/214 |
| 4,237,396 A | 12/1980 | Blenkinsop et al. | |
| 4,538,086 A | 8/1985 | Marsh et al. | |
| 4,538,345 A | * 9/1985 | Diederichs | 29/596 |
| 4,738,020 A | 4/1988 | Neuenschwander | |
| 5,349,741 A | * 9/1994 | Neuenschwander | 29/598 |
| 5,592,731 A | 1/1997 | Huang et al. | |
| 5,755,023 A | 5/1998 | Neuenschwander | |
| 5,771,565 A | * 6/1998 | Walters | 29/596 |
| 5,799,387 A | 9/1998 | Neuenschwander et al. | |
| 5,859,486 A | 1/1999 | Nakahara et al. | |
| 5,945,748 A | 8/1999 | Park et al. | |
| 5,960,533 A | * 10/1999 | Neuenschwander | 29/738 |
| 6,060,810 A | 5/2000 | Lee et al. | |
| 6,131,268 A | 10/2000 | Neuenschwander | |
| 6,153,951 A | 11/2000 | Morita et al. | |
| 6,163,949 A | 12/2000 | Neuenschwander | |
| 6,226,856 B1 | 5/2001 | Kazama et al. | |

* cited by examiner

*Primary Examiner*—Carl J. Arbes
*Assistant Examiner*—Tai Van Nguyen
(74) *Attorney, Agent, or Firm*—Baker & Daniels

(57) ABSTRACT

A method of manufacturing a stack of interlock laminations and thereby shaping the stack of laminations into a desired shape. Each of the individual laminations is formed by a series of punching operations from sheet stock material. The laminations are blanked from the stock material, are stacked atop one another, and are interlocked in a choke. The laminations are thereafter repositioned to form the stack into a second shape. The stacking axis and the core axis may be either parallel or perpendicular to one another. The second shape of the core may be variable in that the second shape may be changed from time to time or may be continuously changed.

20 Claims, 7 Drawing Sheets

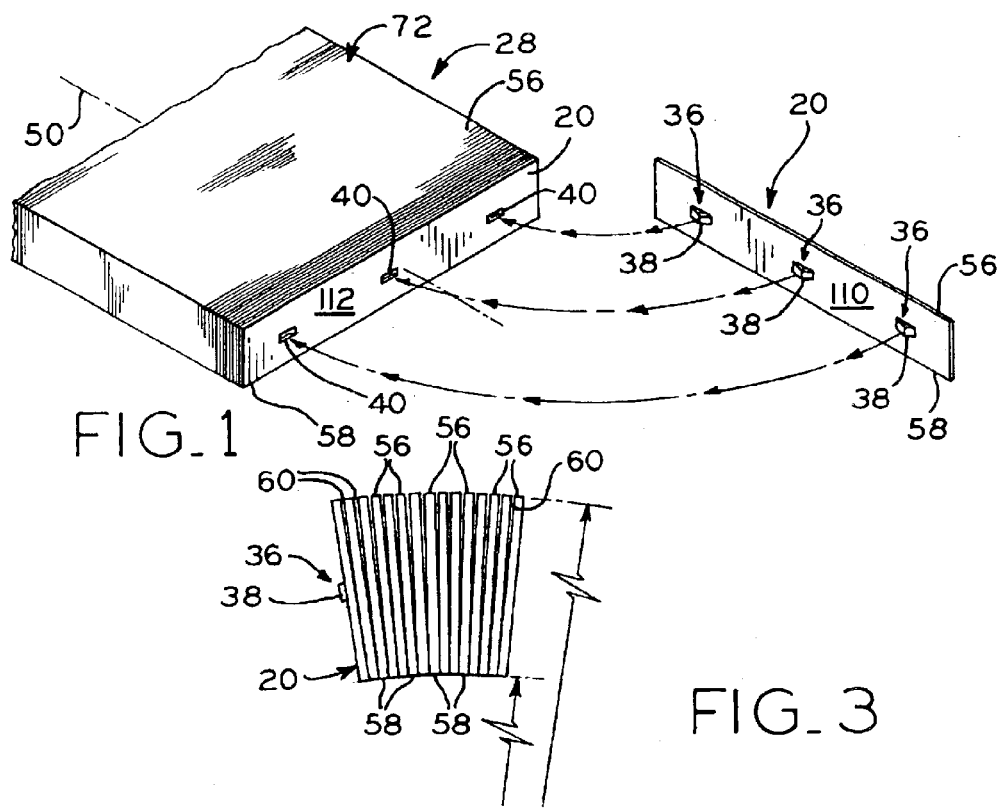
FIG_1
FIG_3
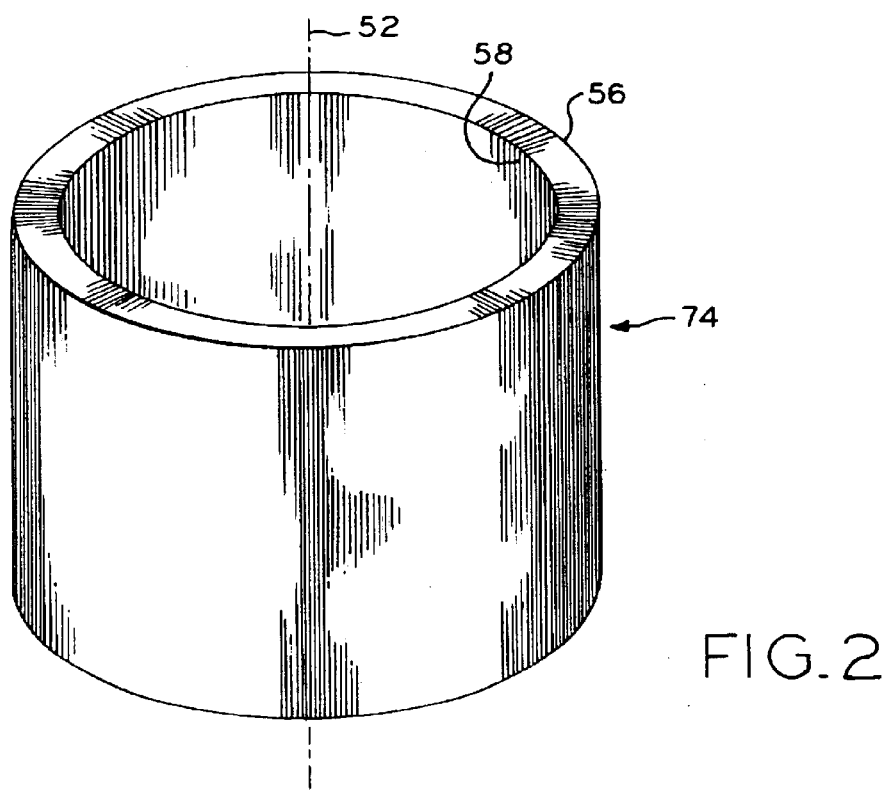
FIG_2

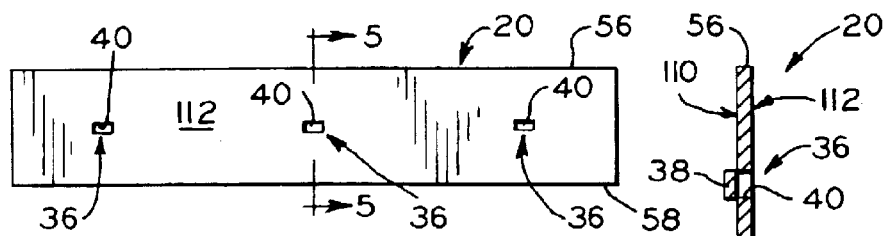
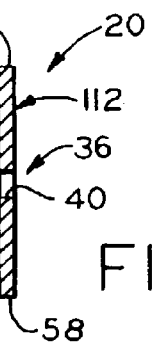
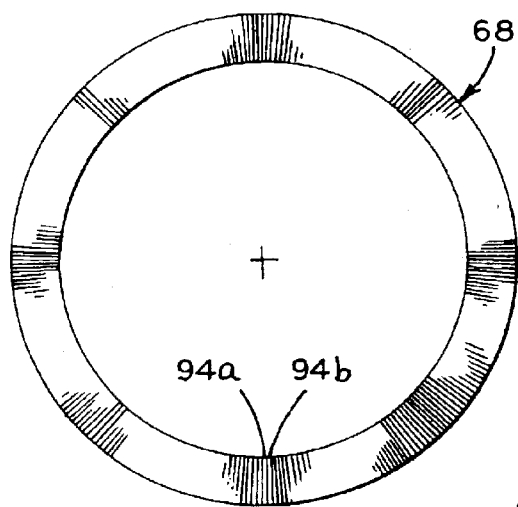
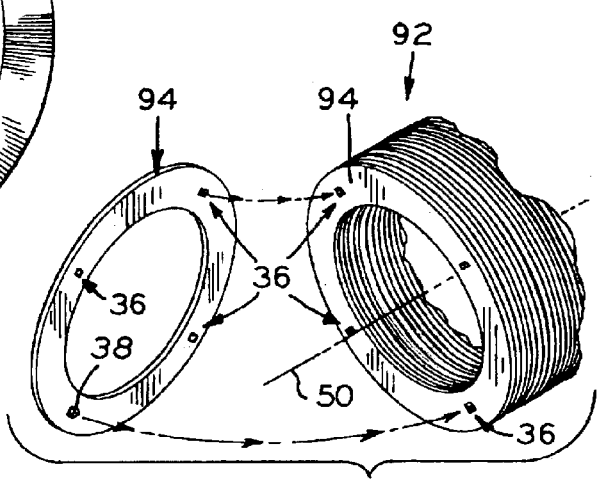
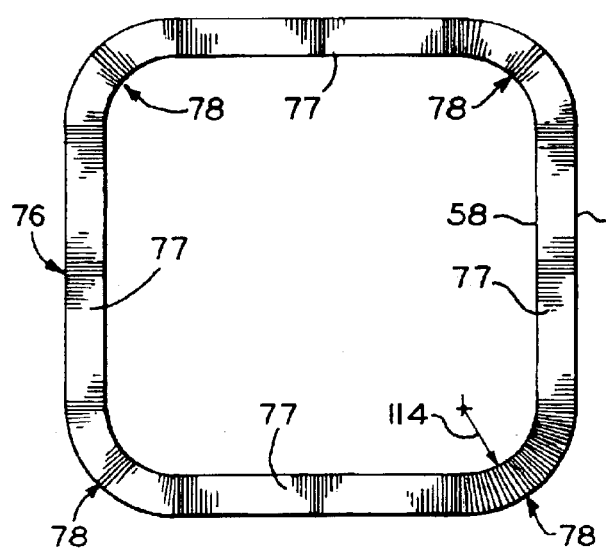
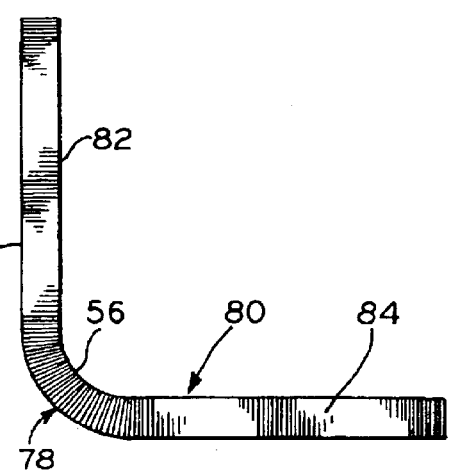

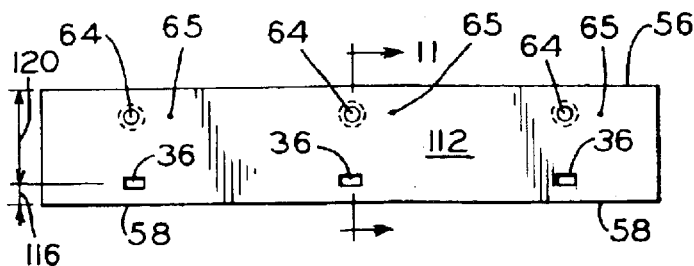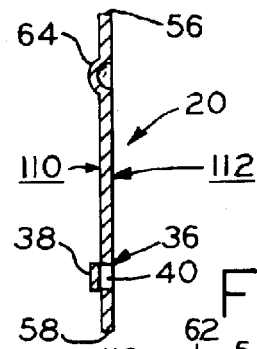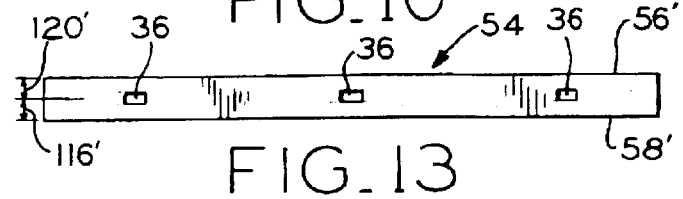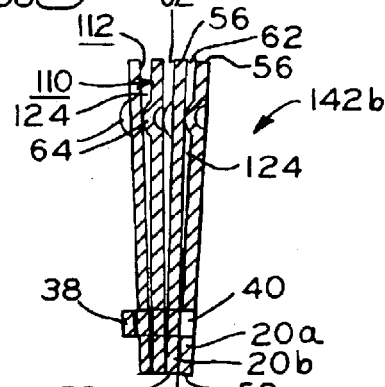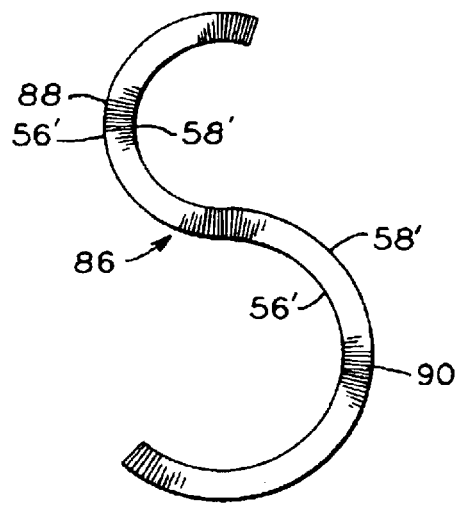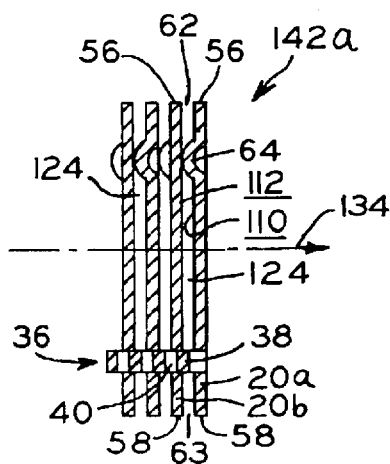

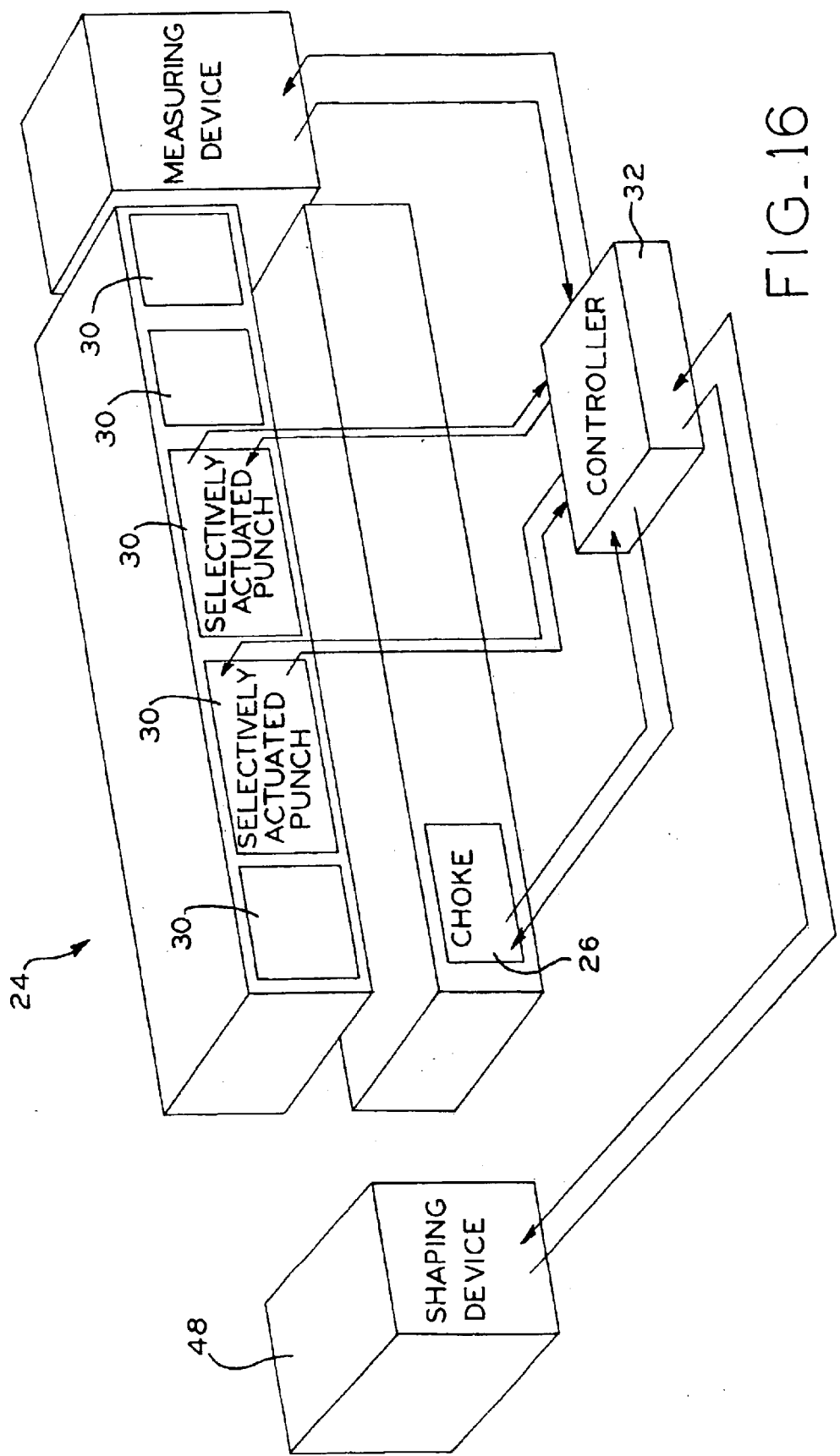
FIG._16

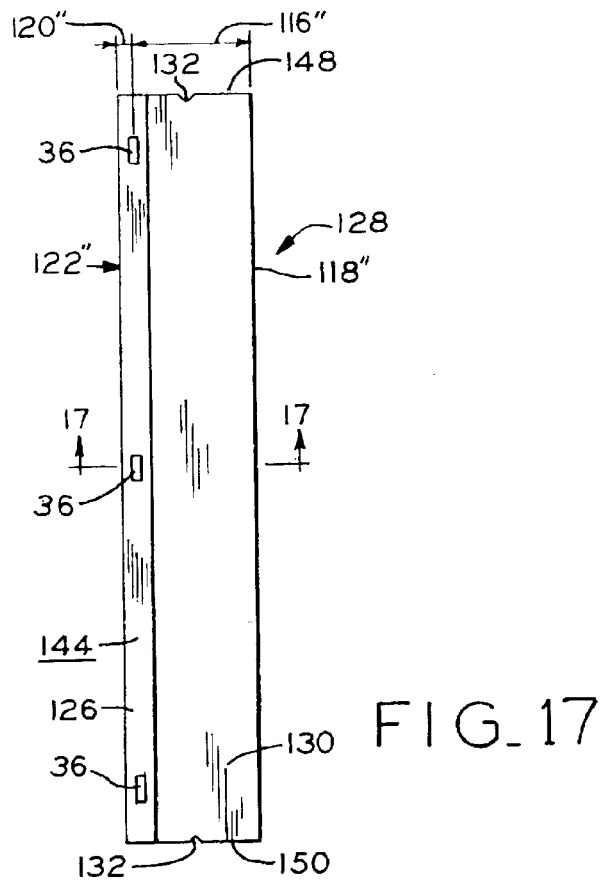
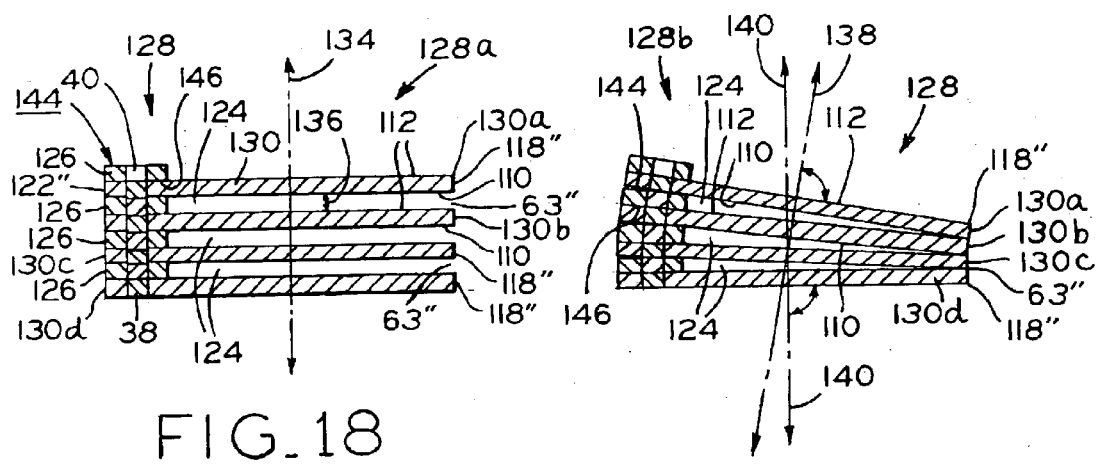
FIG_17
FIG_18
FIG_19

METHOD OF MANUFACTURING A STACK OF LAMINATIONS

BACKGROUND OF THE INVENTION

1. Field of the Invention

The present invention relates to manufacturing interlocked stacks of laminations, and more particularly to a method of making and shaping an interlocked lamination stack.

2. Description of the Related Art

Conventionally, laminations are used to construct interlocked laminated cores for electromagnetic devices such as stator and rotor cores, transformer cores, electromagnet cores, ignition cores, and the like. Such cores may be cylindrical, square, rectangular, pencil shaped and the like. Each of these cores has a stacking axis along which the laminations are stacked, i.e. the direction of stacking, and a stack or core axis. Laminated interlocked cylindrical stator and rotor cores and square or rectangular cores are constructed such that the plane of each lamination is substantially perpendicular to both the core axis and the stacking axis since the core and stacking axes are coaxial. Such cores and the method of making them are described in my U.S. Pat. Nos. 4,738,020 and 6,131,268, the disclosures of which are hereby expressly incorporated herein by reference. The laminations of a cylindrical pencil core such as is shown in my U.S. Pat. No. 6,163,949 are oriented with the plane of each of the lamination(s) substantially parallel to the core axis and substantially perpendicular to the stacking axis. The disclosure of my U.S. Pat. No. 6,163,949 is hereby expressly incorporated herein by reference.

In such prior art cores, each lamination is typically blanked from sheet stock material. The sheet stock material is fed through a series of punching stations in a progressive die to progressively form the laminations. The shape of each lamination may be individually controlled by a controller so that laminations may be provided with different features. Once a lamination has passed through all the punching stations of the progressive die, the lamination is blanked or separated from the carrier sheet stock material. In the last station of the progressive die, the laminations are received in a choke wherein they are stacked and interlocked.

One of the punching stations forms interlock features into each lamination. Interlock tabs are pushed out of the plane of the lamination leaving an interlock slot therein. At the stacking station the interlock tabs of one lamination are received in such interlock slots formed in the previously blanked lamination as the laminations are stacked. The interlock tabs are pressed into the interlock slots by staking punches, which form a part of the blanking station, to secure the, laminations to one another.

The conventional prior art method of producing laminated cores described above utilizes laminations which are all positioned in mutually parallel orientations and the overall final shape of the core is fixed and predetermined by the shape of the individual laminations. Such prior art cores are rigid and have a final fixed shape.

It is desired to provide a method and apparatus for constructing a stack of interlocked laminations wherein the shape of the stack is not fixed and may be determined after the interlocked stack is formed.

SUMMARY OF THE INVENTION

The present invention relates to manufacturing a stack of interlocked laminations and thereafter shaping the stack of laminations into a desired shape. Each of the individual laminations is formed through a series of punching stations from sheet stock material. The laminations are blanked from the stock material, are stacked atop one another, and are interlocked in a choke. The stack is thereafter formed into its final shape. The stacking axis and the core axis may be either parallel or perpendicular to one another. The final shape of the core may even be variable, i.e. the shape may be changed from time to time or may be continuously changed, as needed. By forming the stack of laminations in accordance with the method of the present invention, the stack is flexible, allowing the interlocked stack to be shaped after being formed in the die.

The present invention provides a method of forming a shaped lamination stack including stamping a plurality of laminations from sheet stock material; stacking the laminations into a stack; interlocking the laminations; and shaping the lamination stack into a desired shape.

The present invention also provides a shaped lamination stack manufactured according to the method of forming a stack of laminations, the method including stacking a plurality of laminations to form a lamination stack; and thereafter shaping the lamination stack into a desired shape.

The present invention comprises, in one form thereof, a method of manufacturing a stack of laminations which includes providing a sheet stock material, stamping a plurality of laminations in the stock material, forming a plurality of interlock features in said plurality of laminations and separating each of the plurality of laminations from the stock material, each of the laminations having a first substantially planar surface and an oppositely disposed second substantially planar surface. The method also includes stacking and spacing the plurality of laminations to define a first stack shape wherein each of the first and second surfaces of each of the laminations are oriented substantially parallel and define a linear axis oriented substantially perpendicular to each of the first and second surfaces. When the plurality of laminations are in the first stack shape, a first one and a second one of the plurality of laminations are positioned wherein the first surface of the first lamination faces the second surface of the second lamination and the facing first and second surfaces define a spacing volume therebetween having a substantially uniform thickness. The method also includes interlocking each of the plurality of laminations with an adjacent one of the plurality of laminations with the plurality of laminations disposed in the first stack shape wherein at least one of the plurality of interlock features is at partially disposed within one of the spacing volumes and positioning the plurality of laminations in a second stack shape after the steps of stacking and interlocking the laminations. In the second stack shape, the first surface of the first lamination is repositioned relative to the second surface of the second lamination wherein the spacing volume therebetween has a non-uniform thickness and at least one of the plurality of laminations is disposed at a non-parallel orientation to another one of the plurality of laminations.

The method described above may also include the step of fixing the plurality of laminations in the second stack shape. In one embodiment, the steps of stacking and interlocking the plurality of laminations comprises holding the plurality of laminations in a choke of a progressive die assembly with the plurality of laminations disposed in the first stack shape when held in the choke and removing the plurality of laminations from the choke prior to positioning the plurality of laminations in the second stack shape.

The method described above may also include the step of providing at least one spacing element between the first lamination and the second lamination wherein the spacing element separates the first and second laminations by a distance approximately equivalent to the substantially uniform thickness when the plurality of laminations are disposed in the first stack shape. The spacing element may be provided by forming a projection in one of the first and second laminations. Alternatively, the spacing element may be provided by positioning a spacing lamination between the first and second laminations.

The method described above may take a form wherein each of the plurality of laminations have an edge and adjacent ones of the plurality of laminations define mutually facing pairs of first and second surfaces. Projections are formed in each of the laminations wherein the projections separate the mutually facing pairs of the first and second surfaces when the plurality of laminations are positioned in the first stack shape.

The method described above may alternatively take a form wherein the plurality of laminations includes a first set of laminations. Each of the first set of laminations has a common configuration including a first edge and an opposite second edge and each of the laminations in the first set of laminations includes at least one interlock feature disposed between the first edge and the second edge. Each of the interlock features is disposed at a common first interlock distance from a respective one of the first edges and at a common second interlock distance from a respective one of the second edges. The first edges define a plurality of first gaps between the first edges after stacking the plurality of laminations. Each of the first gaps have a first magnitude when the plurality of laminations is in the first stack shape and the step of positioning the plurality of laminations in the second stack shape comprises moving the first edges relative to each other whereby the first gaps have a second magnitude when the plurality of laminations is in the second stack shape. In one embodiment of such a method, the first interlock distance is substantially equivalent to the second interlock distance. In an alternative embodiment, the first and second interlock distances have different magnitudes, i.e., the first interlock distance may be greater than or less than the second interlock distance. In yet another embodiment, the method includes providing at least one spacing element between a third one of the first set of laminations and a fourth one of the first set of laminations. The spacing element may be asymmetrically disposed relative to the first and second edges of the third and fourth laminations, i.e., it is disclosed closer to either the first edges or the second edges. In still another embodiment, the first and second edges are substantially parallel and each of the laminations include a plurality of interlock features. Each of the interlock features is disposed at the same first interlock distance from a respective first edge and at the same second interlock distance from a respective second edge.

The method described above may involve a plurality of laminations which includes a first end lamination and a second end lamination. The first and second end laminations positioned at opposite ends of the plurality of laminations when the plurality of laminations are positioned in the first stack shape and the step of positioning the plurality of laminations in the second stack shape includes engaging the first end lamination with the second end lamination.

The present invention comprises, in another form thereof, a method of manufacturing a stack of laminations which includes providing a sheet stock material and stamping a plurality of laminations in the stock material and separating each of the plurality of laminations from the stock material, each of the laminations having a first substantially planar surface, an oppositely disposed second substantially planar surface, and an edge. The method also includes stacking the plurality of laminations to define a first stack shape wherein each of the first and second surfaces of each of the laminations are oriented substantially parallel and define a linear axis oriented substantially perpendicular to each of the first and second surfaces. The method also includes positioning at least one spacing element between a first one of the plurality of laminations and a second one of the plurality of laminations. The spacing element provides a spacing volume between the first and second laminations. The spacing volume has a substantially uniform thickness and defines a substantially uniform first distance between the edges of the first and second laminations when the plurality of laminations are positioned in the first stack shape. The method also includes positioning the plurality of laminations in a second stack shape after the stacking and interlocking steps wherein the spacing volume has a non-uniform thickness and defines a second distance between a first portion of the edges of the first and second laminations. The second distance has a different magnitude than the first distance.

The method described above may also include forming an integral projection in the first lamination wherein the integral projection defines the spacing element and projects from the first surface of the first lamination and is engageable with the second surface of the second lamination.

The method described above may take the form wherein the second distance is less than the first distance and a second portion of the edges of the first and second laminations opposite the first portion are separated by a distance substantially equal to the first distance and the spacing element is positioned proximate the second portion.

The method described above may also include stamping a spacing lamination from said stock material and positioning the spacing lamination between the first and second laminations. The spacing lamination has a third substantially planar surface and an oppositely disposed fourth substantially planar surface. Each of the first and second surfaces of the first lamination define a common first surface area, each of the first and second surfaces of the second lamination define a common second surface area and each of the third and fourth surfaces of the spacing lamination define a common third surface area. The third surface area is less than the first surface area and is also less than the second surface area. The first and second surface areas may be approximately equivalent. In one embodiment, the step of positioning the spacing lamination between the first and second laminations further includes interlocking the spacing lamination with the first and second laminations.

The present invention comprises, in another form thereof, a stack of laminations which includes a plurality of substantially planar laminations. The plurality of laminations include a plurality of lamination pairs wherein each pair includes a first lamination and a second lamination defining a spacing volume therebetween. The plurality of laminations define a first stack shape wherein each of the plurality of laminations is interlocked with another one of the plurality of laminations, the plurality of laminations are spaced and oriented in substantially parallel positions and each of the spacing volumes have a substantially uniform thickness. The laminations are relatively repositionable into a second stack shape wherein each of the plurality of laminations remains interlocked, at least one of the pairs of laminations defines a spacing volume having a non-uniform thickness, and at least one lamination of the plurality of laminations is disposed at a non-parallel orientation to another one of the plurality of laminations.

As used herein, a pair of laminations may be formed by any two laminations in a stack. For example, such laminations may be directly adjacent each other or may separated by a spacing element such as a spacing lamination positioned therebetween. A single lamination may also be paired with more than one other lamination. For example, a single lamination may form a pair of laminations with the lamination adjacently below the lamination and form a second pair with a lamination positioned adjacently above the lamination.

The stack described above may take the form wherein each of the plurality of laminations include an edge and the stack also includes at least one spacing element disposed between a first lamination and a second lamination defining a first one of the pairs of laminations. The spacing element disposed within the spacing volume between the first and second laminations of the first pair; the spacing volume defining a first distance between the edges of the first and second laminations of the first pair wherein at least a portion of the edges of the first and second laminations of the first pair define a void therebetween when the plurality of laminations are positioned in the first stack shape. In one embodiment, the spacing element comprises an integral projection extending from the first lamination of the first pair and is engageable with the second lamination of the first pair. In another embodiment, the spacing element comprises a spacing lamination. The spacing lamination may be interlocked with the first and second laminations of the first pair. In yet another embodiment, the first and second laminations of the first pair each include a first major surface and an oppositely disposed second major surface. Each of the first and second major surfaces of the first lamination of the first pair have a common first surface area and each of the first and second major surfaces of the second lamination of the first pair have a common second surface area. The spacing element comprises a spacing lamination having a third major surface and an oppositely disposed fourth major surface. Each of the third and fourth major surfaces have a common third surface area and the third surface area is less than the first surface area and is also less than the second surface area. The first and second surface areas may be approximately equivalent.

The stack described above may also take a form wherein each lamination of the plurality of pairs has a common configuration including a first edge and an opposite second edge. Each lamination of the plurality of pairs includes at least one interlock feature disposed between the first edge and the second edge. Each of the interlock features are disposed at a common first interlock distance from the first edge and at a common second interlock distance from the second edge. The first edges define a plurality of first gaps between the first edges after stacking the plurality of laminations. Each of the first gaps have a first magnitude when the plurality of laminations is positioned in the first stack shape and the first gaps have a second magnitude when the plurality of laminations is repositioned to position the plurality of laminations in the second stack shape. In alternative embodiments, the first interlock distance may be substantially equivalent to, greater than or less than the second interlock distance. In another embodiment, at least one spacing element is disposed between one of the pairs of laminations. In such an embodiment, the spacing element may be asymmetrically disposed relative to the first and second edges. In other embodiments, the first and second edges are substantially parallel and each lamination of the plurality of pairs include a plurality of interlock features wherein each of the interlock features is disposed at the first interlock distance from a respective one of the first edges and at the second interlock distance from a respective one of the second edges.

The present invention comprises, in another form thereof, a stack of laminations which includes a plurality of substantially planar, interlocked laminations. The plurality of laminations form a plurality of lamination pairs wherein each of the pairs have a first lamination and a second lamination. The stack also includes a plurality of spacing elements. Each of the lamination pairs have at least one of the spacing elements disposed between the first lamination and the second lamination of the pair. The plurality of interlocked laminations are positionable in a first stack shape wherein each of the plurality of laminations is oriented substantially parallel to the other laminations of the plurality of laminations and the plurality of laminations define a linear axis oriented substantially perpendicular to each of the plurality of laminations. The plurality of spacing elements define a spacing volume between the first and second laminations of each of the pairs. Each of the spacing volumes have a substantially uniform thickness when the plurality of laminations are positioned in the first stack shape. The plurality of interlocked laminations are repositionable in a second stack shape wherein at least one of the spacing volumes has a non-uniform thickness and at least one of the plurality of laminations is disposed at a non-parallel orientation to another one of the plurality of laminations.

The stack described above may take the form wherein a plurality of the spacing volumes have a non-uniform thickness when the stack is positioned in the second stack shape and the plurality of spacing volumes having non-uniform thicknesses each have a substantially equivalent configuration and magnitude.

The stack described above may also take a form wherein the plurality of spacing elements includes an integral projection extending from the first lamination of a first one of the pairs and engaging the second lamination of the first pair. The plurality of spacing elements may alternatively include a spacing lamination positioned between the first and second laminations of a first one of the pairs. Such a spacing lamination may be interlocked with each of the first and second laminations of the first pair.

The stack described above may also include a spacing lamination positioned between the first and second laminations of a first one of the pairs wherein the first and second laminations of the first pair respectively define a first major surface and a second major surface. The first and second major surfaces are disposed in a mutually facing orientation and have a common first surface area. The spacing lamination has a third major surface and an oppositely disposed fourth major surface wherein the third major surface is engaged with the first major surface and the fourth major surface is engaged with the second major surface. The third and fourth major surfaces each have a surface area which is less than the first surface area. In one embodiment of such a stack, the first and second laminations of the first pair each have an edge and the spacing lamination is disposed asymmetrically with respect to the edges.

One advantage of the present invention is that it provides a method for manufacturing laminated stacks which have laminations which are not all positioned in a mutually parallel orientation thereby providing for a method for efficiently manufacturing a broad range of stack shapes.

Another advantage of the present invention is that the stack of interlocked laminations is flexible, and can be manipulated into a desired shape.

A further advantage of the present invention is that the stack may be shaped into its final shape after being stacked and interlocked.

Yet another advantage of the present invention is that by providing a spacing element between a pair of laminations within a laminated stack, a spacing volume may be created between the pair of laminations which facilitates the repositioning of the laminated stack into a second stack shape.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a perspective view of a stack of interlocked, rectangular laminations and showing one lamination exploded therefrom;

FIG. 2 is a perspective view of a cylindrical core;

FIG. 3 is a view of a stack of interlocked laminations while being flexed;

FIG. 4 is a view of a lamination showing a plurality of interlocks formed therein;

FIG. 5 is a sectional view of FIG. 4 along the line 5—5;

FIG. 6 is a perspective view of a stack of interlocked, cylindrical laminations showing one lamination exploded therefrom;

FIG. 7 is a plan view of a hollow toroidal core;

FIG. 8 is a plan view of a square or rectangular core;

FIG. 9 is a plan view of an L-shaped part;

FIG. 10 is a view of a lamination showing a plurality of interlocks and dimples formed therein;

FIG. 11 is a sectional view of FIG. 10 along the line 11—11;

FIG. 12A is a sectional view of a stack of the interlocked laminations of FIG. 10 in a first stack shape;

FIG. 12B is a sectional view of a stack of the interlocked laminations of FIG. 10 in a second stack shape;

FIG. 13 is a view of a narrow lamination showing a plurality of interlocks formed therein;

FIG. 14 is a plan view of an S-shaped stack of laminations;

FIG. 16 is a schematic illustration of the connections between the progressive die and a controller;

FIG. 17 is a view of a stack of laminations having a spacing lamination;

FIG. 18 is a cross sectional view taken along line 17—17 of FIG. 17 with the lamination stack positioned in a first stack shape;

FIG. 19 is a cross sectional view taken along line 17—17 of FIG. 17 with the lamination stack positioned in a second stack shape;

Figure 15:
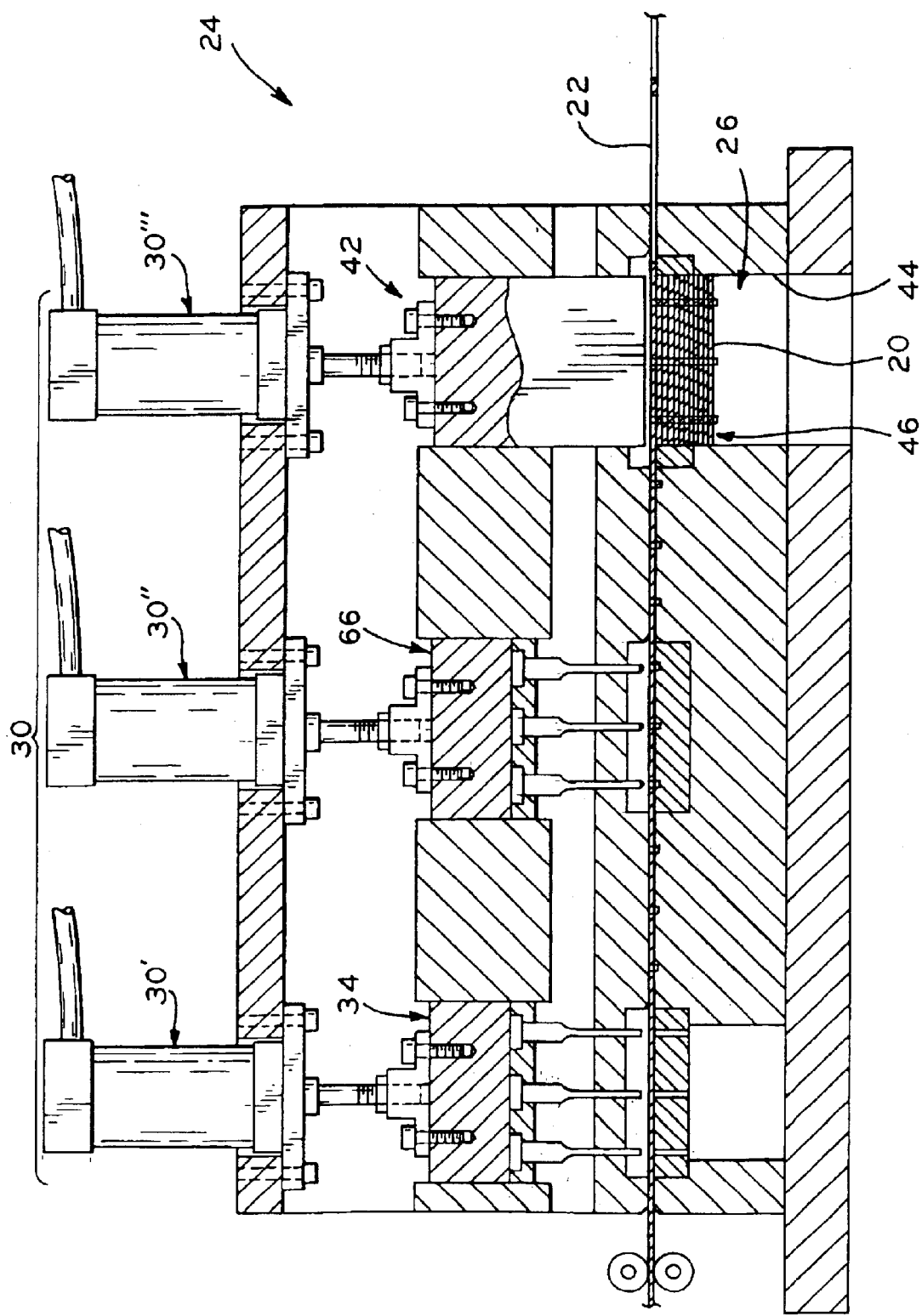
FIG. 15 is a schematic view of a portion of a progressive die for forming a stack of interlocked laminations.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE INVENTION

Referring to FIGS. 1, 15, and 16, in general, a plurality of laminations 20 are individually formed and blanked from sheet stock material 22 by progressive die 24. Laminations 20 are stacked atop one another in choke 26 of die 24 and are interlocked to form a stack of interlocked laminations 28 (FIG. 1). Stack 28 is thereafter removed from choke 26 and shaped into an end product which may be used in any desired device such as, e.g., an electric motor or generator.

Laminations 20 are individually blanked from sheet stock material 22 as it is fed through progressive die 24. Referring to FIGS. 15 and 16, die 24 includes a series of punching stations 30 used to form laminations 20 which may have selectively actuated punches enabling the die to stamp or create laminations of different shapes and having different features. Each punching station 30 may remove a particular portion of lamination 20 such that when lamination stack 28 is formed, the variously shaped laminations create different features of the desired end product, e.g., ears or flanges and windows. Punches in stations 30 may be selectively operable by controller 32 as shown in FIG. 16. A program in controller 32 determines which punches in stations 30 are used to create the shape of the individual laminations and which punches in stations 30 remain idle.

One punching station 30' (FIG. 15) includes punch 34 which may be used to create interlock features 36 in laminations 20 for interlocking adjacent laminations 20 in lamination stack 28. Punch 34 pushes a portion of sheet stock material 22 out of the plane of the lamination to form tab 38 and slot 40. The material pushed from slot 40 forming tab 38 generally remains attached to material 22. However, in some instances, it may be desirous to remove tab 38 completely. For example, tabs 38 of the first lamination of a new stack are removed. This prevents the first lamination of the new stack from interlocking with the last lamination of a previously constructed stack when the two laminations are in contact in the choke of the progressive die.

Referring to FIG. 15, after laminations 20 are blanked from sheet stock material 22 by punch 42 of blanking station 30''', the laminations are received in choke 26. Choke 26 is sized so that lamination 20 is held therein with an interference fit with wall 44 of choke 26 being in contact with at least two portions of the lamination. Additional laminations 20 are stacked atop subsequent laminations in partial stack of laminations 46. Lamination 20 is aligned with and interlocked to partial stack of laminations 46 by staking punches (not shown) which may be an integral part of blanking station 30'''. The staking punches are sized to be received in slots 40 to align lamination 20 with the partial stack of laminations 46 and press tabs 38 into slots 40 of the previously stacked lamination, thereby interlocking adjacent laminations.

FIG. 15 is a schematic representation of a progressive die assembly and does not illustrate the mechanisms by which individual stamping stations may selectively actuated. The selective actuation of stamping stations is well known in the art and U.S. Pat. No. 6,163,949 discloses one such mechanism which may be used to selectively actuate a stamping station and is hereby expressly incorporated herein by reference.

Once a predetermined number of laminations 20 are stacked and interlocked, the completed stack of laminations 28 is formed (FIG. 1).

After the complete stack of laminations 28 is removed from choke 26 it is shaped. Stack 28 is flexible, pivoting about interlock elements 36, which allows lamination stack 28 to be shaped after the stack is formed. The shaping step may be achieved using any suitable method. One such method which is envisioned uses mechanical shaping device 48 shown in FIG. 16 which is operable by controller 32. Shaping device 48 may also be, e.g., independently controlled from die 24 by a separate controller, manually controlled, or the like. Stack of laminations 28 may alternatively be shaped manually. For example, lamination stack 28 may be pressed against a template surface to position stack 28 in a desired shape and lamination stack 28 may then be fixed in the desired shape by securing one or more of the laminations forming lamination stack 28 to each other or to a separate part using adhesives, welding, brazing, or the like.

The shaped stack of laminations 28 may have any desired form with, for example, the ends of stack 28 being secured to one another, or one or both ends may be secured to portions of the device in which the stack is being received. Any suitable method may be used to secure the ends of stack 28 including adhesives, welding, brazing, or the like. The shape of stack of laminations 28 may also be variable with the shape being changed during use of the stack, e.g., constantly changing or being changed from time to time.

Figure 20:
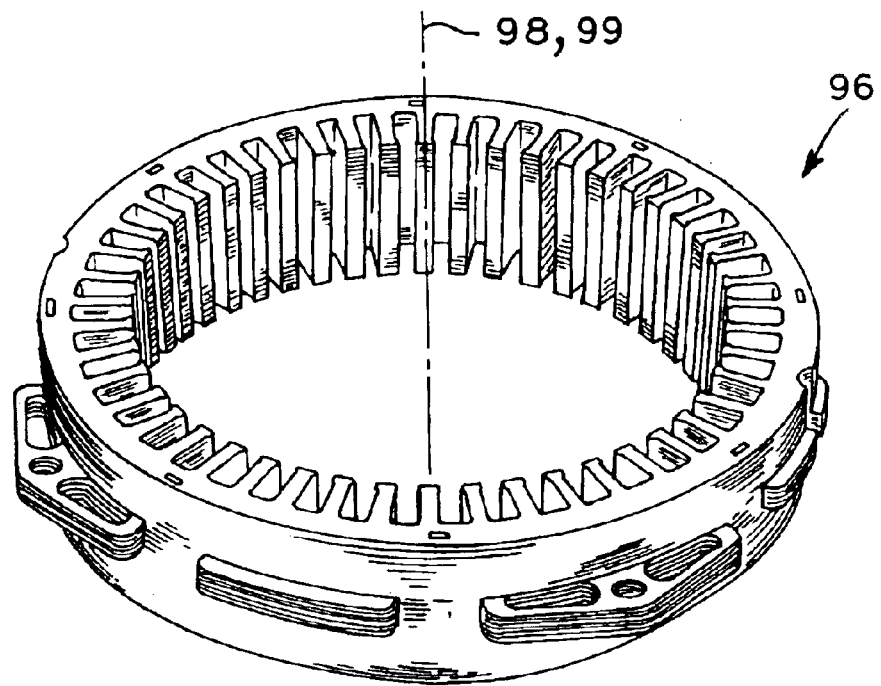
FIG. 20 is a perspective view of a stator core manufactured using a prior art method.
Figure 21:
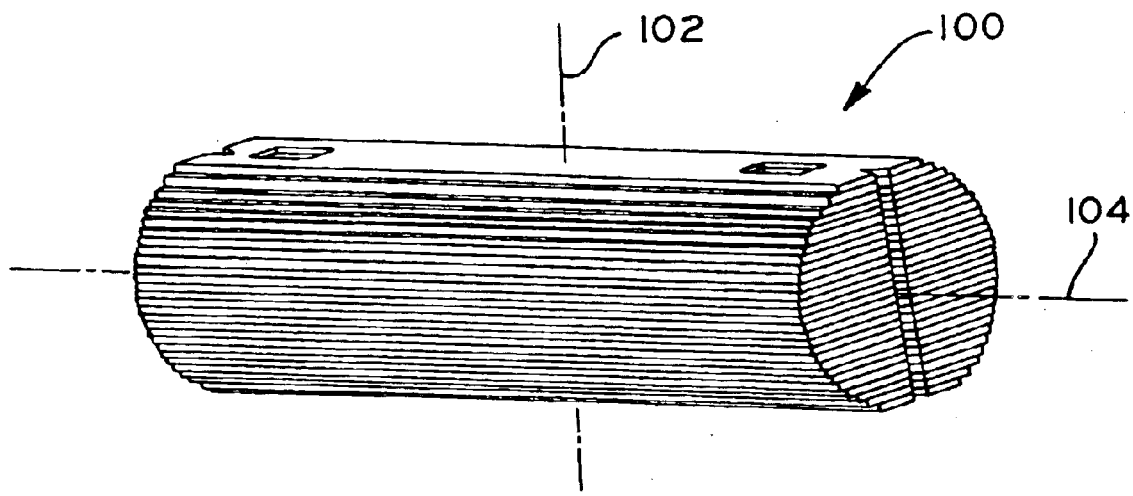
FIG. 21 is a perspective view of a pencil shaped core manufactured using a prior art method.

The shaped stack of laminations 28 has a stacking axis and a core axis. The stacking axis is the axis along which laminations 20 are stacked such as axis 50 shown in FIG. 1. When stack 28 is held in choke 26, axis 50 is linear and oriented perpendicularly to each lamination 20 and each major surface 110, 112 of laminations 20. Once stack 28 is shaped, an axis which intersects each lamina 20 at a perpendicular angle may no longer be straight line and takes the shape of the end product. The core axis is the axis of the shaped stack of laminations such as central axis 52 of cylindrical core 74 shown in FIG. 2. The relationship of the core and stacking axes of the present invention may differ from that of prior art cores. For example, the core axis and stacking axis of a prior art cylindrical core are coaxial. Referring to FIGS. 1 and 2, when stack 28 is shaped into cylindrical core 74, core axis 52 is substantially perpendicular to stacking axis 50. Further, the plane of each lamination 20 is parallel to core axis 52. Referring to FIG. 20, cylindrical stator core 96 manufactured using a prior art method has core axis 98 and stacking axis 99 which are substantially parallel. Prior art pencil shaped core 100 shown in FIG. 21 has stacking axis 102 which is substantially perpendicular to core axis 104. In each of these two prior art cores, 96, 100, however, all of the laminations forming the core are mutually parallel, i.e., each of the laminations is parallel to each of the other laminations in the core.

The size and shape of the end product is defined by the attributes of the individual laminations 20 when the laminations are stacked on top of one another into stack 28. The number of laminations in stack 28 partially determines the overall size of the end product with the number of laminations and the size of the end product being directly proportional. The size of laminations 20 further dictates the available radiuses of curvature (e.g., radius of curvature 114 of corner 78 shown in FIG. 8) which may be formed by stack 28 with a stack of wider laminations having a minimum radius which is larger than the minimum radius which may be formed by a stack of narrower laminations. In general, smaller, more compact parts with tighter curves can be formed using smaller sized laminations such as narrow laminations 54 shown in FIG. 13.

The number and placement of interlock elements 36 may also vary the shape of the end product. Referring to FIG. 3, when lamination stack 28 is flexed, and the laminations are pivoted about interlock elements 36, an amount of space or gap 60 opens between the edges 56 or 58 of a pair of adjacent laminations 20. The allowable or available amount of space 60 which may be formed between edges 56, 58 of adjacent laminations is determined in part by the placement of interlock elements 36 in relationship to edges 56, 58. Referring to FIGS. 1, 4, and 5, interlock elements 36 are located along the longitudinal axis of laminations 20. When stack of laminations 28 is flexed, edges 56 of the laminations fan slightly to open space 60 while edges 58 come into contact with one another (FIG. 3). Alternatively, as illustrated in FIGS. 10 and 12, interlock elements 36 may be located proximate edge 58 of lamination 20 such that edges 56 have space or gap 62 located therebetween which is greater than space 60 (FIG. 3). Thus, with interlock elements 36 located nearer the inner diameter of the part, stack 28 is more easily flexed and the amount of space between the outer lamination edges may be more easily increased. Although laminations 20 are shown having three or four interlock elements 36, other quantities of interlocks may be used to secure adjacent laminations.

As can be seen in FIGS. 10 and 13, a plurality of interlock features 36 which includes interlock tabs 38 and interlock slots 40, may be positioned on a lamina 20, 54. All of the interlock features 36 located on lamina 20 are each positioned at a first distance 116 from first edge 58 and a second distance 120 from second edge 56. Second edge 56 is disposed opposite first edge 116 and, as can be seen in FIG. 10, first interlock distance 116 is less than second interlock distance 120. As can be seen in FIG. 13, all of the interlock features 36 located on lamina 54 are located a first distance 116' from first edge 58' and a second distance 120' from second edge 56' wherein first distance 116' is substantially equivalent to second distance 120'.

Referring to FIGS. 10–12, to further increase and preserve the amount of separation between adjacent laminations, spacing dimples 64 may be formed in lamination 20 proximate edge 56 by punch 66 of selectively actuated punching station 30" shown in FIG. 15. When a plurality of laminations 20 having spacing dimples 64 are interlocked, dimples 64 preserve space between lamination edges 56 allowing stack 28. Spacing dimples 64 may be used to facilitate a bluing or annealing process as further described in my U.S. Pat. No. 5,349,741, the disclosure of which is hereby expressly incorporated herein by reference. To avoid having spacing dimples 64 of adjacent laminations nest within each other, the location of spacing dimples 64 can be alternated for every other lamination by the use of two sets of selectively actuated punches. FIGS. 10 and 12 illustrate the use of such alternating dimple locations where reference numeral 65 indicates the center of the alternative locations of spacing dimples 64.

Spacing dimples 64 are spacing elements taking the form of an integral projection formed in a lamina which provide a spacing volume 124 between mutually facing pairs of first and second major surfaces 110 and 112 of laminations 20 as can be seen in FIGS. 12A and 12B. FIG. 12B illustrates laminations 20 after they have been removed from choke 26 and repositioned in a second stack shape 142b wherein not all of the laminations 20 are mutually parallel. While present in choke 26 and prior to repositioning laminations 20 into the second stack shape 142b, laminations 20 are each positioned in a mutually parallel position wherein the mutually facing surfaces 110 of 112 of adjacent laminations are positioned at a distance equivalent to gap 62 over their full area as illustrated in FIG. 12A. Paired laminations 20a and 20b are also both oriented perpendicular to linear axis 134 when they are positioned in the first stack shape illustrated in FIG. 12A. As also shown in FIG. 12A, interlock tab 38 of lamination 20a extends between laminations 20a and 20b and engages interlock slot 40 of lamination 20b. Interlock tab 38 has some flexibility to allow for repositioning laminations 20a and 20b from first stack shape 142a shown in FIG. 12A into second stack shape 142b shown in FIG. 12B. Spacing volumes 124 may be formed by spacing elements which are positioned between and separate a pair of stacked laminas such as spacing dimples 64 and spacing laminations 126 and are discussed in greater detail below.

As can be seen in FIG. 12A, when laminations 20 are positioned to form first stack shape 142a, interlock tabs 38 are partially disposed in spacing volume 124 and extend through spacing volume 124 to engage an interlock slot 40 of an adjacent lamination 20. When laminations 20 have been repositioned into second stack shape 142b, interlock features, i.e., interlock tabs 38 and interlock slots 40, of adjacent laminations 20 remain engaged. During such repositioning of laminations 20, interlock tabs 38 may be flexed by the relative movement of laminations 20. Repositioning of laminations 20 into second stack shape 142b may also result in one or more interlock tabs 38 being repositioned within interlock slots 40 while remaining engaged therewith, or there may be some combination of flexing and repositioning of interlock tabs 38 by the repositioning of laminations 20 into second stack shape 128b.

The end product into which stack of laminations 28 is shaped may take on any desired form including the embodiments described hereinbelow. Referring to FIG. 1, the interlocked stack of laminations 28 may be in the form of slab 72. Slab 72 includes three interlock elements 36 positioned along the centerline of each lamination 20. Referring to FIG. 2, slab 72 is manipulated to form hollow cylindrical core 74 for use as, e.g., a stator or rotor core in a motor. Cylindrical core 74 has core axis 52 which is perpendicular to stacking axis 50 of slab 72 (FIG. 1). When slab 72 is shaped, inner edges 58 of laminations 20 in slab 72 come into contact with one another while outer edges 56 fan from one another slightly leaving spaces 60 between laminations 20 (FIG. 3).

Referring to FIG. 8, slab 72 may also be shaped to form hollow square or rectangular core 76 which may be a transformer core, for example. Core 76 includes linear portions 77 and curved corners 78. The radius of corners 78 is defined in part by the width of lamination 20 which may determine the minimum radius into which stack 76 may be formed. For example, the laminations of core 76 are wider than those illustrated in FIG. 13, thus, corners 78 of core 76 are larger than if slab 72 used to construct core 76 were a stack of laminations 54.

A third embodiment is illustrated in FIG. 9 in which slab 72 is bent to form L-shaped product 80 including legs 82, 84 and corner 78. The free ends of legs 82, 84 may be secured to other portions of the device into which L-shaped product 80 may be installed. Legs 82 and 84 may also be nonlinear having curves formed therein, for example.

Referring to FIGS. 13 and 14, slab 72 may be constructed from stacked laminations 54 which are narrower than lamination 20. In this embodiment, slab 72 is shaped into S-shaped product 86 with curved portions 88 and 90. With slab 72 being constructed from laminations 54, curved portions 88 and 90 may have a relatively smaller radius creating a smaller, more compact end product. The location of interlock elements 36 may also influence the degree of curvature in S-shaped product 86. Interlock elements 36 may be located proximate edge 56 of laminations 24 in curved portion 90 and proximate edge 58 of laminations 24 in curved portion 88 to increase the amount of curvature. One or more laminations having interlock elements 36 proximate both edges 56 and 58 may be used to provide interconnect the laminations which have interlock elements 36 disposed proximate opposite edges. The axis which perpendicularly intersects each lamination of slab 72 takes the shape of S-shaped product 86 and is substantially perpendicular to the axes of each curved portion 88 and 90.

Referring to FIG. 6, interlocked stack of laminations 28 may be in the form of hollow cylinder 92 constructed from a plurality of cylindrical laminations 94. As with slab 72, laminations 94 are stacked along stacking axis 50 and interlocked. Cylinder 92 may be manipulated into any suitable manner to form a desired shape including those described above. One such shape may be hollow toroidal core 68 shown in FIG. 7 formed when the end laminations 94a and 94b of cylinder 92 are engaged and secured to one another. Prior to forming stack 68 into the shape shown in FIG. 7, end laminations 94a and 94b would be positioned at opposite ends of the plurality of laminations which form stack 68. Additionally, the ends of cylinder 92 may be secured within the device into which cylinder 92 is being installed forming a tube extending through the device. Unlike laminations 20, 54, laminations 94 have interlock features 36 which are not located along a single line about which the lamination is pivoted when it is moved relative to the other laminations to which it is interlocked. To facilitate the relative movement of laminations 94 after such laminations have been stacked and interlocked, the choke into which laminations 94 are blanked and stacked may be configured such that the stacks within the choke present a relatively light backpressure to the downward stroke of the blanking punch resulting in a looser engagement between adjacent laminations in the resulting stacks. The control of the backpressure within a choke is subject to numerous variables known in the art such as the interference between the laminations and the choke surfaces and the depth of the choke. For example, for stacks constructed using laminations such as lamination 94 which do not have interlock features which are all aligned with the pivot axis of the individual laminas, a relatively light backpressure could be used to obtain a looser fit and larger spacing volume 124 between adjacent laminations to facilitate their relative movement from a first stack shape wherein all of the laminations in the stack are mutually parallel into a second stack shape wherein at least one of the laminations is no longer parallel to each of the other laminations.

Another stack of laminations 128 which are in accordance with the present invention is shown in FIGS. 17–19. Stack 128 is formed by alternatively stacking laminations 130 and spacing laminations 126. Each of the laminations 130 and spacing laminations 126 are interlocked with adjacently stacked laminations 130 or spacing laminations 126. Laminations include guide slots 132 which mate with a vertically extending ridge or projection in choke 26 (which may be formed by a carbide insert) and thereby guide laminations 130 within choke 26 during the manufacture of stack 128 and hold laminations 130 in a desired position within choke 26. Spacing laminations 126 do not have an outer perimeter which conforms with the outer perimeter of laminations 130 and when spacing laminations 126 are separated from the strip stock material and stacked in choke 26, spacing laminations 126 are guided by staking punches and may be partially interlocked with a lamination held within choke 26 prior to fully separating spacing lamination 126 from the stock material. The staking punches, not illustrated, project a short distance from the lower surface of blanking punch 42 and project into interlock slots 40 of the lamination being blank and, if the lamination being blanked includes interlock tabs 38, forcibly engage interlock tabs 38 of the lamination being blanked with the uppermost lamination positioned in choke 26. Spacing laminations 126 may engage choke surfaces within choke 26 along that portion of its outer perimeter which conforms to the outer perimeter of laminations 130. Spacing laminations 126 are also held in place by engagement of their interlock tabs 38 with an adjacent lamination 130 which forms the previously blanked lamination. The manufacture of a stack which includes laminations having differing outer perimeters as well as the use of guide slots in the manufacture of a lamination stacks is further described in my U.S. Pat. No. 6,163,949 which is hereby expressly incorporated herein by reference.

When stack 128 is manufactured, it is stacked in first stack shape 128a illustrated in FIG. 18. Stack 128 is positioned in the first stack shape 128a while it is being held in choke 26. After removing stack 128 from choke 26, the laminations forming stack 128 may be repositioned such that stack 128 takes the second stack shape 128b shown in FIG. 19.

Each lamination 130, e.g., laminations 130a–130d shown in FIGS. 18 and 19, has a first substantially planar surface 110 and an oppositely disposed second substantially planar surface 112. A plurality of laminations 130 define first stack shape 128a wherein each of the first and second surfaces 110, 112 of each of the laminations are oriented substantially parallel and define a linear axis 134 oriented substantially perpendicular to each of the first and second surfaces 110, 112. Linear axis 134 is oriented substantially perpendicular to spacing laminations 126 as well as laminations 130. Although linear axis 134 is not shown intersecting laminations 126, linear axis 134 is positioned perpendicular to the planes which are defined by laminations 126. When the plurality of laminations are in the first stack shape, a first one 130a and a second one 130b of the plurality of laminations 130 are positioned wherein the first surface of the first lamination faces the second surface of the second lamination and the facing first and second surfaces define a spacing volume 124 therebetween having a substantially uniform thickness 136. As shown in FIG. 19, in the second stack shape 128b, the first surface 110 of the first lamination 130a is repositioned relative to the second surface 112 of the second lamination 130b wherein the spacing volume 124 therebetween has a non-uniform thickness and lamination 130a is disposed at a non-parallel orientation to the other laminations 130 as demonstrated by the axes 138 and 140 which are perpendicular to laminations 130a and 130d respectively.

Spacing lamination 126 separates laminations 130a and 130b by a distance substantially equivalent to thickness 136. When in first stack shape 128a, edges 118" and 122", side edges 148, 150 connecting edges 118" and 122", and mutually facing major surfaces 110, 112 of the first and second laminations 130a, 130b are all spaced apart by a distance approximately equivalent to the substantially uniform thickness 136. Similarly, with reference to FIG. 1, laminations 20, although not including spacing elements therebetween, form a first stack shape wherein laminations 20 are separated by a uniform spacing volume and have interlock tabs 38 extending through such uniform spacing volume to interlock adjacent laminations 20 which may then be repositioned into a second stack shape, as exemplified by FIGS. 2 and 3, wherein the individual laminations 20 are separated by a non-uniform spacing volume and at least one of the laminations 20 is no longer parallel to each of the other laminations 20.

With regard to FIGS. 17–19, stack 128 includes a first set of laminations defined by laminations 130 (i.e., laminations 130a, 130b, 130c, 130d) which each have a common configuration including a first edge 118" and an opposite second edge 122". Edges 118" and 122" are parallel to each other and laminations 130 have a generally rectangular shape. Each of the laminations 130 includes interlock features 36 disposed between first edge 118" and second edge 122". Each of the interlock features 36 is disposed at a common first interlock distance 116" from first edge 118" and at a common second interlock distance 120" from second edge 122". In the embodiment illustrated in FIGS. 17–19, first interlock distance 116" is greater than second interlock distance 120".

The first edges 118" define a plurality of first gaps 63" between first edges 118" after stacking laminations 130. Each first gap 63" has a first magnitude when laminations 130 are in first stack shape 128a and repositioning laminations 130 into second stack shape 128b involves moving first edges 118" relative to each other whereby first gaps 63" have a second magnitude when laminations 130 are in second stack shape 128b. In first stack shape 128a, gaps 63" are substantially equivalent to thickness 136. In second stack shape 128b, gaps 63" are approximately zero, i.e., laminations 130 contact each other at first edges 118". Similarly, when the stack of laminations illustrated in FIGS. 12 and 12A is repositioned from first stack shape 142a to second stack shape 142b, gaps 63 defined by first edges 58 change magnitude.

As can be seen with reference to FIG. 19, by placing spacing laminations 126 such that an outer edge of spacing laminations 126 aligns with edge 122" of laminations 130 and bringing edges 118" of laminations 130 into contact when placing stack 128 into second stack shape 128b, the inner arcuate surface of stack 128, defined by edges 118", and the outer arcuate surface of stack 128, defined by edges 122" and outer edges of spacing laminations 126, are both substantially solid surfaces without any gaps between the lamination edges.

Spacing volumes 124 have a substantially uniform thickness 136 and define a substantially uniform first distance equivalent to thickness 136 between the edges of laminations 130a and 130b when laminations 130 are positioned in first stack shape 128a. After positioning laminations 130 in second stack shape 128b, spacing volume 124 has a non-uniform thickness and defines a second distance between portions of the edges of first and second laminations 130a and 130b. For example, the distance defined between edges 118" at gap 63" is approximately zero. Similarly, repositioning laminations 20 from first stack shape 142a to second stack shape 142b closes gap 63.

Spacing laminations 126 are located asymmetrically with respect to edges 118" and 122" to facilitate the relative movement of laminations 130. Similarly, spacing dimples 64 are located asymmetrically with respect to parallel edges 56 and 58 to facilitate the relative movement of laminations 20. Alternative embodiments, however, could employ spacing elements positioned symmetrically with respect the edges of the laminations.

Each spacing lamination 126 has a substantially planar surface 144 on one side and an oppositely disposed substantially planar surface 146. The major planar surfaces 110, 112 of lamination 130a define a common surface area which is larger than the common surface area defined by the major surfaces 144 and 146 of spacing lamination 126. Similarly, major surfaces 110, 112 of lamination 130b define a common surface area which is substantially equivalent to the common surface area of the major surfaces 110, 112 of lamination 130a and which is larger than the common surface area defined by major surfaces 144 and 146. Thus, placing spacing lamination 126 between laminations 130a and 130b will both separate laminations 130a and 130b and also, when laminations 130a and 130b are positioned in first stack shape 128a, provide a void space between laminations 130a and 130b, as for example at edges 118", which facilitates the later relative movement of laminations 130a and 130b, as for example into the positions shown in FIG. 19. Although those portions of the outer edges of a pair of laminations 130 defined by edges 118" are positioned closer together when stack 128 is placed in second stack position 128b, those portions of the outer edges of a pair of laminations defined by edges 122" are separated by spacing laminations 126 and are still positioned at a distance substantially equivalent to thickness 136.

In first stack shape 128a, portions of edges 148 and 150 also define void spaces between adjacent laminations 130 and repositioning laminations 130 into second stack shape 128b changes the magnitude of the gap between portions of edges 148 and 150 as well as edges 118". For example, those portions of edges 148 and 150 between guide slot 132 and edges 118" of adjacent laminations 130 will be separated by a smaller distance when stack 128 is positioned in second stack shape 128b compared to the distance separating edges 148 and 150 when stack 128 is positioned in first stack shape 128a.

Laminations 130a and 130b form a lamination pair and are both interlocked with spacing lamination 126 which is located therebetween. Similarly, laminations 130b and 130c form a lamination pair with a spacing lamination 126 located therebetween. Laminations 130b and 130c also define a spacing volume 124 therebetween. Spacing laminations 126 are disposed within spacing volumes 124 and, thus, that portion the interlock tabs 38 extending from laminations 130 which are engaged with spacing laminations 126 are also disposed within a spacing volume 124. As laminations 130 and stacking laminations 126 of stack 128 are relatively repositioned to form second stack shape 128b, laminations 130 and stacking laminations 126 remain interlocked and spacing volumes 124 defined between pairs of laminations 130 define a non-uniform thickness and whereby laminations 130 no longer all remain mutually parallel.

In the embodiment illustrated in FIGS. 17–19, each of the spacing laminations 126 have a common configuration, each of the laminations 130 have a common configuration and gaps 63" are all closed such that edges 118" contact each other when stack 128 is placed in second stack shape 128b. Consequently, each of the spacing volumes 124 defining a non-uniform thickness when stack 128 is in second stack shape 128b have substantially equivalent configurations and magnitudes. The use of spacing elements such as spacing laminations 126 or spacing dimples 64 which can be reliably reproduced in the same size and location with respect to the laminations which they separate, facilitates greater control and consistency over spacing volumes 124 both in a first stack shape wherein all of the laminations are mutually parallel and oriented perpendicular to a linear axis and in a second stack shape wherein at least some of the laminations have been relatively repositioned to define non-uniform spacing volumes. This enhanced control and consistency is achieved in part by providing surfaces on the laminations and spacing elements which can be controlled and brought into contact when repositioning the stack into a second stack shape wherein not all of the laminations are mutually parallel by creating one or more non-uniform spacing volumes within the stack. For example, the opposite major surfaces of spacing laminations 126 engage laminations 130 and when laminations 130 are repositioned into second stack shape 128b, edges 118" of adjacent laminations 130 are also brought into contact.

During manufacture of stack 128, guide slots 132 matingly engage a projection located in choke 26 which resists the relative rotation of laminations 130 within choke 26 into second stack shape 128b and thereby facilitates the maintenance of stack 128 in first stack shape 128a while stack 128 is located in choke 26 and having additional laminations secured thereto. It would also be possible to utilize spacing laminations 126 with laminations 20 illustrated in FIGS. 10 and 11 which have spacing dimples 64. Such spacing dimples 64 would facilitate the maintenance of the laminations in mutually parallel positions while the laminations were being stacked within a choke. The dimples could then be forcibly compressed to form the stack into a second stack shape similar to shape 128b shown in FIG. 19. Other combinations of spacing elements such as spacing laminations 126 and spacing dimples 64 are also possible.

Although the illustrated embodiments show spacing elements, e.g., dimples 64 and spacing laminations 126, being used between each pair of adjacent laminations, it is not necessary to use such spacing elements between each pair of adjacent laminations. For example, if a stack having a larger radius of curvature was desired, spacing elements could be positioned at alternative intervals, for example, such spacing elements could be used to separate every third lamination from an adjacent lamination in the stack. Spacing elements could also be used in only certain portions of the stack, for example, the stacks illustrated in FIGS. 8 and 9 could be manufactured by placing spacing elements at the desired location of corners 78 and manufacturing the remainder of the stack without such spacing elements. Such spacing elements could also be used at irregular intervals to create curved shapes having a variable radius.

It is noted that the above described embodiments are merely examples of end products into which a stack of laminations, constructed according to the method described herein, may be shaped and other shapes and end products may also be formed in accordance with the present invention.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of manufacturing a stack of laminations, said method comprising:

providing sheet stock material;

stamping a plurality of laminations in said stock material, forming a plurality of interlock features in said plurality of laminations and separating each of said plurality of laminations from said stock material, each of said laminations having a first substantially planar surface and an oppositely disposed second substantially planar surface;

stacking and spacing said plurality of laminations to define a first stack shape wherein each of said first and second surfaces of each of said laminations are oriented substantially parallel and define a linear axis oriented substantially perpendicular to each of said first and second surfaces and a first one and a second one of said plurality of laminations positioned wherein said first surface of said first lamination faces said second surface of said second lamination and said facing first and second surfaces define a spacing volume therebetween having a substantially uniform thickness;

interlocking each of said plurality of laminations with an adjacent one of said plurality of laminations with said plurality of laminations disposed in said first stack shape wherein at least one of said plurality of interlock features is partially disposed within one of said spacing volumes; and repositioning said plurality of laminations into a second stack shape after said stacking and interlocking steps whereby said first surface of said first lamination is repositioned relative to said second surface of said second lamination so that said spacing volume assumes a non-uniform thickness and at least one of said plurality of laminations is disposed at a non-parallel orientation to another one of said plurality of laminations.

2. The method of claim 1 further comprising the step of fixing said plurality of laminations in said second stack shape.

3. The method of claim 1 wherein said steps of stacking and interlocking said plurality of laminations comprise holding said plurality of laminations in a choke of a progressive die assembly, said plurality of laminations disposed in said first stack shape when held in said choke; said method further comprising removing said plurality of laminations from said choke prior to said repositioning step.

4. The method of claim 1 further comprising providing at least one spacing element between said first lamination and said second lamination prior to said repositioning step, said spacing element separating said first and second laminations by a distance approximately equivalent to said substantially uniform thickness when said plurality of laminations are disposed in said first stack shape.

5. The method of claim 4 wherein said step of providing at least one spacing element comprises forming a projection in one of said first and second laminations.

6. The method of claim 4 wherein said providing at least one spacing element comprises positioning a spacing lamination between said first and second laminations.

7. The method of claim 1 wherein each of said plurality of laminations has an edge and adjacent ones of said plurality of laminations define mutually facing pairs of said first and second surfaces, said method further comprising forming a projection in each of said laminations, said projections separating said mutually facing pairs of said first and second surfaces when said plurality of laminations are positioned in said first stack shape.

8. The method of claim 1 wherein said plurality of laminations includes a first set of laminations, each of said laminations in said first set of laminations having a common configuration including a first edge and an opposite second edge, each of said laminations in said first set of laminations including at least one of said interlock features disposed between said first edge and said second edge, each of said interlock features disposed at a common first interlock distance from a respective one of said first edges and at a common second interlock distance from a respective one of said second edges, said first edges defining a plurality of first gaps between said first edges after stacking said plurality of laminations, each of said first gaps having a first magnitude when said plurality of laminations is in said first stack shape, said repositioning step comprising moving said first edges relative to each other whereby said first gaps have a second magnitude when said plurality of laminations is in said second stack shape.

9. The method of claim 8 wherein said first interlock distance is substantially equivalent to said second interlock distance.

10. The method of claim 8 wherein said first and second interlock distances have different magnitudes.

11. The method of claim 8 wherein said method further comprises the step of providing at least one spacing element between a third lamination of said first set of laminations and a fourth lamination of said first set of laminations.

12. The method of claim 11 wherein said spacing element is asymmetrically disposed relative to said first and second edges of said third and fourth laminations.

13. The method of claim 8 wherein said first and second edges are substantially parallel and each of said laminations include a plurality of said interlock features, each of said interlock features disposed at said first interlock distance from a respective said first edge and at said second interlock distance from a respective said second edge.

14. The method of claim 1 wherein said plurality of laminations includes a first end lamination and a second end lamination, said first and second end laminations positioned at opposite ends of said plurality of laminations when said plurality of laminations are positioned in said first stack shape and said step of positioning said plurality of laminations in said second stack shape comprises engaging said first end lamination with said second end lamination.

15. A method of manufacturing a stack of laminations, said stack comprising:

providing a sheet stock material;

stamping a plurality of laminations in said stock material and separating each of said plurality of laminations from said stock material, each of said laminations having a first substantially planar surface, an oppositely disposed second substantially planar surface, and an edge;

stacking said plurality of laminations to define a first stack shape wherein each of said first and second surfaces of each of said laminations are oriented substantially parallel and define a linear axis oriented substantially perpendicular to each of said first and second surfaces;

positioning at least one spacing element between a first one of said plurality of laminations and a second one of said plurality of laminations, said spacing element providing a spacing volume between said first and second laminations, said spacing volume having a substantially uniform thickness defining a substantially uniform first distance between said edges of said first and second laminations when said plurality of laminations are positioned in said first stack shape; and repositioning said plurality of laminations into a second stack shape after said stacking and interlocking steps whereby the spacing volume assumes a non-uniform thickness and defines a second distance between a first portion of said edges of said first and second laminations, said second distance having a different magnitude than said first distance.

16. The method of claim 15 further comprising the step of forming an integral projection in said first lamination, said integral projection defining said spacing element and projecting from said first surface of said first lamination and engageable with said second surface of said second lamination.

17. The method of claim 15 further comprising the steps of stamping a spacing lamination from said stock material and positioning said spacing lamination between said first and second laminations, said spacing lamination having a third substantially planar surface and an oppositely disposed fourth substantially planar surface; each of said first and second surfaces of said first lamination defining a common first surface area, each of said first and second surfaces of said second lamination defining a common second surface area and each of said third and fourth surfaces of said spacing lamination defining a common third surface area, said third surface area being less than said first surface area and less than said second surface area.

18. The method of claim 17 wherein said step of positioning said spacing lamination between said first and second laminations further comprises interlocking said spacing lamination with said first and second laminations.

19. The method of claim 17 wherein said first and second surface areas are approximately equivalent.

20. The method of claim 15 wherein said second distance is less than said first distance and a second portion of said edges of said first and second laminations opposite said first portion are separated by a distance substantially equal to said first distance, said spacing element positioned proximate said second portion.

* * * * *